(12) United States Patent
Kesterson

(10) Patent No.: US 8,170,229 B2
(45) Date of Patent: May 1, 2012

(54) AUDIO PRIVACY APPARATUS AND METHOD

(76) Inventor: James Carl Kesterson, Plano, TX (US)

( * ) Notice: Subject to any disclaimer, the term of this patent is extended or adjusted under 35 U.S.C. 154(b) by 797 days.

(21) Appl. No.: 12/264,649

(22) Filed: Nov. 4, 2008

(65) Prior Publication Data

US 2009/0190770 A1   Jul. 30, 2009

Related U.S. Application Data

(60) Provisional application No. 61/001,990, filed on Nov. 6, 2007.

(51) Int. Cl.
*H03B 29/00* (2006.01)
*G10K 11/16* (2006.01)

(52) U.S. Cl. ............... 381/71.8; 381/71.14; 379/392.01; 455/296

(58) Field of Classification Search ............ 381/71.8, 381/71.14; 379/392.01; 455/67.13, 296, 455/297, 222
See application file for complete search history.

(56) References Cited

U.S. PATENT DOCUMENTS

| | | | | |
|---|---|---|---|---|
| 4,686,693 A * | 8/1987 | Ritter | .......................... | 381/73.1 |
| 6,041,126 A * | 3/2000 | Terai et al. | ................... | 381/71.6 |
| 6,654,467 B1 * | 11/2003 | York et al. | ................. | 381/71.14 |
| 6,690,800 B2 * | 2/2004 | Resnick | ....................... | 381/73.1 |
| 6,952,474 B2 * | 10/2005 | Wittke et al. | ............ | 379/406.02 |
| 6,978,010 B1 * | 12/2005 | Short et al. | .............. | 379/388.03 |
| 7,031,460 B1 * | 4/2006 | Zheng et al. | ............ | 379/406.06 |
| 7,058,185 B1 * | 6/2006 | Egelmeers et al. | ............ | 381/93 |
| 7,088,828 B1 * | 8/2006 | Bradford et al. | ............ | 381/71.1 |
| 7,756,491 B2 * | 7/2010 | Kee et al. | ................... | 455/114.3 |
| 7,809,129 B2 * | 10/2010 | Wu et al. | ................. | 379/406.01 |
| 7,835,774 B1 * | 11/2010 | Appell et al. | ................ | 455/570 |
| 7,996,048 B1 * | 8/2011 | Mikan et al. | ................. | 455/570 |
| 2006/0002570 A1 * | 1/2006 | Vaudrey et al. | ................ | 381/92 |
| 2006/0029212 A1 * | 2/2006 | Short et al. | .............. | 379/388.03 |
| 2006/0204015 A1 * | 9/2006 | Ip et al. | ....................... | 381/71.1 |
| 2007/0083361 A1 * | 4/2007 | Ferencz et al. | ............... | 704/201 |
| 2008/0107282 A1 * | 5/2008 | Asada | ....................... | 381/71.14 |
| 2008/0112570 A1 * | 5/2008 | Asada et al. | ................ | 381/71.6 |
| 2008/0118081 A1 * | 5/2008 | Chang | ......................... | 381/94.1 |
| 2008/0126059 A1 * | 5/2008 | Harrison | ........................ | 703/13 |
| 2009/0034755 A1 * | 2/2009 | Short et al. | ................... | 381/94.1 |
| 2009/0318107 A1 * | 12/2009 | Sorrells et al. | ............... | 455/323 |
| 2010/0296666 A1 * | 11/2010 | Lin | ............................... | 381/71.6 |
| 2011/0092177 A1 * | 4/2011 | Sorrells et al. | ............... | 455/323 |
| 2011/0093262 A1 * | 4/2011 | Wittke et al. | ................. | 704/226 |
| 2011/0105034 A1 * | 5/2011 | Senders et al. | .............. | 455/63.1 |
| 2011/0153320 A1 * | 6/2011 | Kim et al. | ..................... | 704/226 |

* cited by examiner

*Primary Examiner* — David S. Warren

(57) ABSTRACT

Apparatus and Method for canceling or reducing voice sounds produced during a conversation by the user of a cellular telephone or other communication device such that other persons close to the user cannot hear the users voice and is not disturbed by the conversation.

31 Claims, 5 Drawing Sheets

AUDIO PRIVACY APPARATUS AND METHOD

This application claims the benefit of U.S. Provisional Application No. 61/001,990, filed on Nov. 6, 2007, entitled Audio Privacy Apparatus and Method, which application is hereby incorporated herein by reference.

TECHNICAL FIELD

This invention relates generally to the field of reducing sounds, and more particularly to the reduction of audible conversational sounds that can be overheard by persons close by but not parties to the conversation. A primary example is the reduction or substantial elimination of such sounds occurring during a cellular telephone conversation in public areas such as a restaurant.

BACKGROUND

The advent of the ubiquitous cellular telephones often results in loud conversations by a user that cannot only be overheard, but may be both embarrassing and unwelcome by persons in close proximity to the user. Although adherence to the rules of common courtesy by cell phone users would eliminate much of the unpleasantness of overhearing a private conversation, often a person will receive a call that is an emergency or so important, the receiving party has no choice but to answer or respond to the call and carry on a private conversation when another person is in close proximity even though they would rather that the conversation be private and not overheard. The present invention provides apparatus and methods to provide such privacy as well as a way to reduce the unpleasantness of being forced to hear conversations by discourteous persons.

SUMMARY OF THE INVENTION

This reduction of sounds from a particular and localized source, including but not limited to providing privacy while carrying on a conversation in a public setting or otherwise is generally solved or circumvented, and technical advantages are generally achieved by the apparatus and method embodiments of the present invention. The apparatus and methods reduce sound waves that fall within a selected band of frequencies at their source. A specific example is a human voice or audio speaker providing sound waves at about 300 Hz to about 3400 Hz. The Apparatus of the invention may be used by itself to eliminate or reduce undesirable sounds, but is especially useful when it works with a user device, such as for example only, a cellular telephone, a Public Address System, or some other type of a private two-way communication device such as a Walkie Talkie.

Regardless of the specific application or use, the apparatus will include a microphone or other device that receives the source sound waves and then generates first electrical signals in response to and representative of the source sound waves. The first electrical signals are then received by circuitry that generates a second set or additional electrical signals also representative of the source sound waves. Importantly, however, the generated additional electrical signals are inverted or phase shifted by about 180 degrees with respect to the original electrical signals. An IC (integrated circuit) connected as a signal inverter circuit that phase shifts the signals by 180 degrees is particularly useful for accomplishing this step.

The phase shifted or inverted additional signals are then provided to a device, such as one or more audio speakers, for generating cancellation sound waves representative of the phase shifted or additional electrical signals.

According to a preferred embodiment, the phase-shifted signals are selectively amplified before being sent to the audio speaker. More specifically, the cancellation sound waves are inverted or generated to be 180 degrees out of phase with the source sound waves and to have substantially the same amplitude. The audio speaker or speakers are positioned as close to the source of the sound waves as possible, but no farther away than about 10 centimeters. Thus, the inverted or 180 degrees out of phase sound waves and the source sound waves interfere with each other so that the source sound waves are at least partially canceled by the cancellation sound waves and the cancellation sound waves are at least partially cancelled by the source sound waves.

If the invention is used in combination with a user electronic device such as a PA system, sound recorder, telephone, or other communication device, the first electrical signals generated by the microphone and representative of the original or source sound waves are also sent to the normal circuitry of the user device.

The foregoing has broadly outlined the features of the present invention in order that the detailed description of the invention that follows may be better understood. Additional features and advantages will be described hereinafter, which form the subject of the claims of the invention. It should be appreciated by those skilled in the art that the conception and specific embodiments disclosed might be readily used as a basis for modifying or designing other structures or processes for carrying out the same purpose as the present invention. It should also be realized by those skilled in the art that such constructions do not depart from the spirit or scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
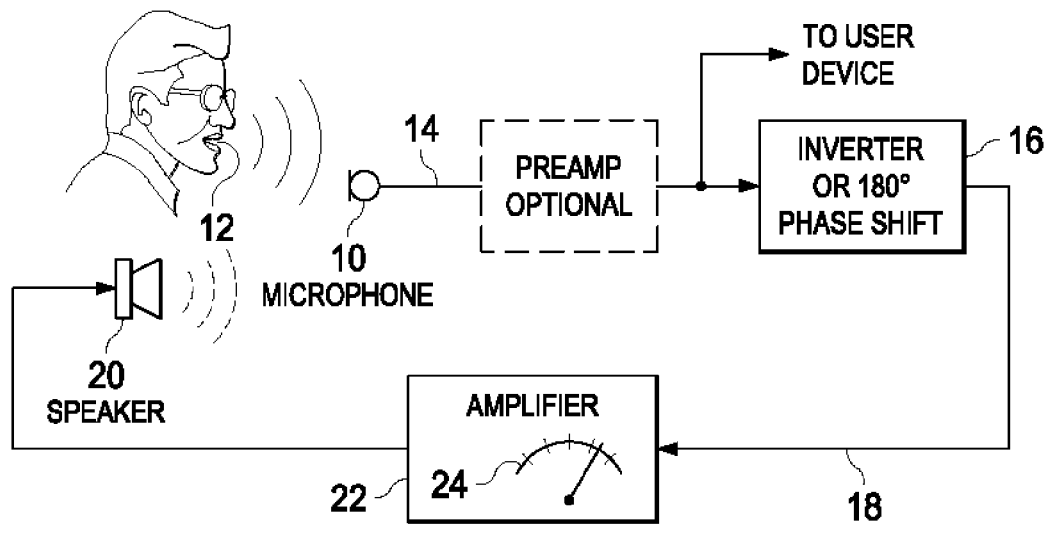
FIG. 1A is a simplified circuit diagram illustrating an embodiment of the invention.

Referring now to FIG. 1A, there is show a simplified block diagram of the invention. As shown, the invention includes a microphone or other device 10 for receiving sound waves from a sound source 12. In a preferred embodiment, sound source 12 will be a person talking, but could be other sound sources that are to be cancelled or substantially reduced. The sound waves from the source 12 are then converted by the microphone or other device 10 so as to generate electrical signals that are inserted onto an electrical connection, wire or line 14. The electrical signals are representative of the sound waves from source 12. The electrical output signals from the device or microphone 10 on wire or line 14 are then received by the electrical circuitry 16 where they are inverted or otherwise phase shifted by about 180 degrees. These inverted or phase shifted signals are then provided on line 18 as a second set or additional signals that are substantially the same as the electrical signals from the microphone 10 except that they are inverted or phase shifted by about 180 degrees with respect to the original electrical signals from microphone 10. Although, other circuits that can shift the phase of the signals by about 180 degrees may be used, an Integrated Circuit (IC) connected as a signal inverter is a very effective, simple and inexpensive choice. The inverted or phase shifted additional or second set of signals are provided by circuitry 16 as an output onto line 18 where they are transmitted to a speaker arrangement 20. They are preferably amplified, such as by way of amplifier 22 before being received by the speaker arrangement 20. The speaker arrangement 20 then converts the inverted or phase shifted amplified electrical signals to cancellation sound waves that are substantially the same as the sound waves from the original source 12, except the cancellation sound waves from the speaker arrangement 20 will be about 180 degrees out of phase with the original or source sound waves. Also as will be appreciated by those skilled in the art, for effective cancellation of the source sound waves, the cancellation sound waves should originate at a spatial location very close to the same spatial location as the original sounds or sounds to be cancelled. Therefore, speaker arrangement 20 is preferably located at a distance from microphone 10 that is as close as possible, but less than about a quarter wave length of the sound waves being generated by source 12. This distance will preferably be less than about 8 to 10 centimeters and preferably less than about 2.5 centimeters (i.e. one-quarter wavelength at 3400 Hz. The output volume of amplifier 22 should be set so that the amplitude or volume of the cancellation sound from speaker arrangement 20 is substantially the same as the volume of the sound from source 12.

Figure 2A:
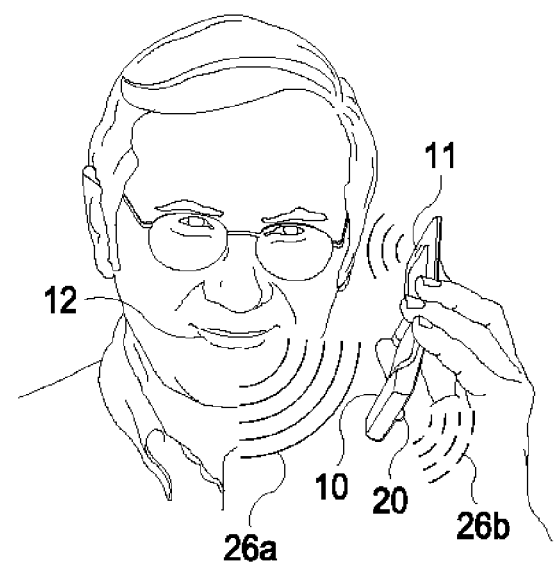
FIG. 2A illustrates a preferred placement of the speaker arrangement of the present invention when used with a communication device, such as a cell phone.

As an example of the placement of the speaker arrangement 20, a cell phone or other communication device has a microphone (that can also be used as microphone 10 of the present invention) on the front side and at a bottom portion of the cell phone as illustrated in FIG. 2A such that the user can easily hold the speaker 11 of the device to his ear and speak into the microphone 10. Thus, the user creates sound waves that leave the users mouth and radiate or travel outward from the mouth 12 of the user as represented by the solid concentric circles 26a shown in FIG. 2A. Therefore, to effectively cancel the sound waves created by the user, (i.e. the source sound waves) cancellation sound waves generated by the speaker arrangement 20 should be located proximate the users mouth so that they travel away from the speaker arrangement 20 in a similar pattern as is shown by dashed concentric circles 26b. Therefore, when the cancellation sound waves generated by the speaker arrangement are inverted or phase shifted about 180 degrees with respect to the source sound waves and have substantially the same amplitude the two sets of sound waves interfere with and cancel each other so that they significantly reduce any source sounds or cancellation sounds that can be heard.

Figure 3B:
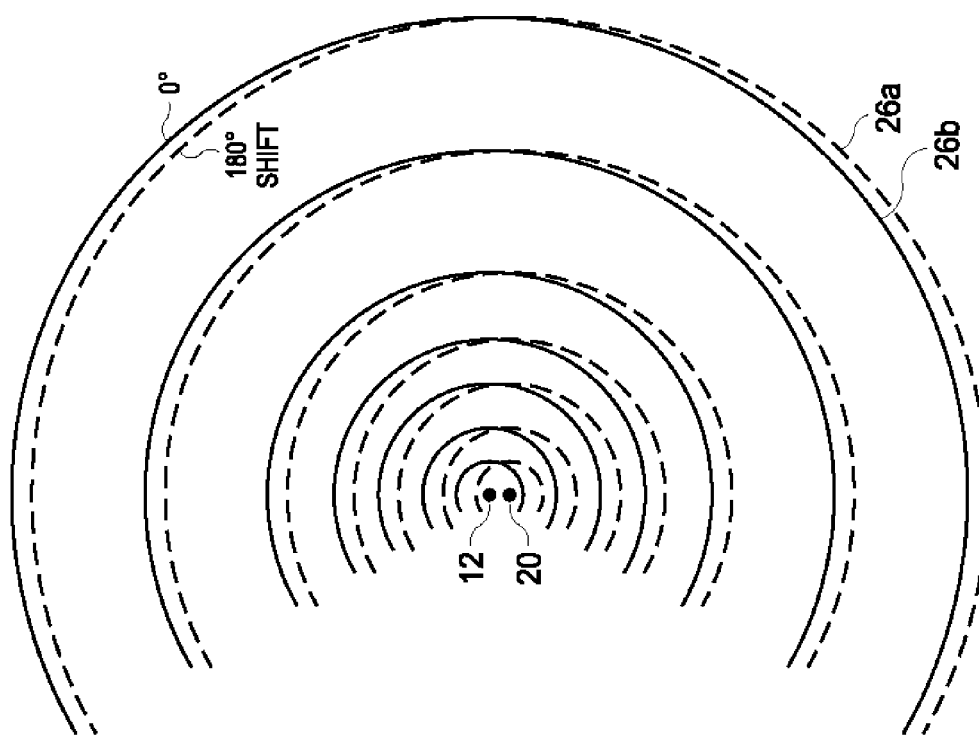
FIGS. 3A and 3B illustrate the interference of source sound waves and sound waves generated by a speaker that are 180 degrees out of phase with the source sound waves to help explain the operation of the invention.
Figure 3A:
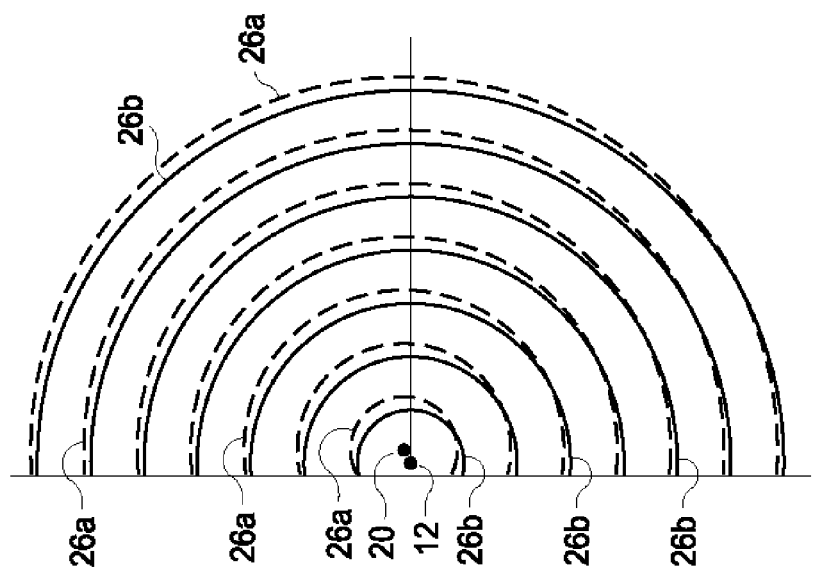

FIG. 3A is a graphic illustration of the interference between a first and second set of sound waves that will cancel each other. The speaker 20 generates cancellation sound waves (dashed concentric circles) and is illustrated as being spaced about ¼ wave length in front of sound source 12 that provides the original sound waves (solid concentric circles). It will also be appreciated that if the source sound waves have a specific tone or frequency and a specific amplitude, and the set of cancellation sound waves generated according to the teachings of this invention have the same amplitude and the same tone, but are inverted or phase shifted 180 degrees, and the cancellation sound waves (represented by dashed concentric circles 26a) almost correspond or overlap exactly with the source sound waves (represented by solid line concentric circles 26b), the source sounds and the cancellation sounds would both be completely cancelled. However, as will be understood by those skilled in the audio arts, exact correspondence or overlap of the two sets of sound waves is not necessary to substantially reduce the resulting sounds. FIG. 3B is similar to FIG. 3A, except it shows original sound source 12 and the speaker 20 side by side and spaced ¼ wave length of a lower frequency. In each Figure, it is seen that there is substantial over lap of the sound waves which results in noticeable cancellation of the two sounds. It will also be appreciated by those skilled in the art that although cancellation sound waves that are inverted or phase shifted 180 degrees with respect to the original or source sound waves is preferred and is the most effective to eliminate sounds, it is believed that a phase shift of 180 degrees plus 360 degrees (i.e. a full wave cycle) or 180 degrees plus a whole number multiple of wave cycles up to about eight or ten will also cancel a portion of most sounds. More specifically, it will be appreciated by those skilled in the art that sound waves created by human speech vary significantly with respect to frequency, volume and the duration or amount of time any specific frequency is produced by a voice. Therefore, the graphic illustration of FIGS. 3A and 3B are not intended to represent a long duration or continuous tone, but only a small specific slice of a voiceprint that does have substantially a constant amplitude and frequency. That been said, however, it will also be appreciated that although a sampling of the sound waves of human speech may vary significantly in frequency and amplitude from a later sampling and assuming the human voice producing the sound waves is in the frequency range of about 300 Hz to 3400 Hz., the number of frequency cycles that can be inverted or phase shifted in., for example only) 1/100 of a second will vary from between a low value of about 3 at 300 Hz to a high value of over 30 at 3400 Hz. Therefore, it is seen that even at a sound wave frequency of around 300 Hz. a phase shift of 180 degrees plus three cycles (i.e. 1080 degrees) would still result in one complete sound wave or about ⅓ of the sound wave cycles in the 1/100 of a second being cancelled. The number of sound wave cycles that will be cancelled with a phase shift of 180 degrees plus three cycles will, of course increase as the frequency of these sound waves increases. Thus, at higher sound wave frequencies some cancellation of sound waves will occur even when the phase shift is as high as 180 degrees plus 8 or 10 cycles. Therefore, it is seen that although an inverted or a 180 degree phase shifted signal is preferable and most effective, a general reference in this application to an inverted signal or 180 degree phase shift signal is intended to also include 180 degree plus a whole number of up to at least three cycles unless indicated otherwise.

Figure 1B:
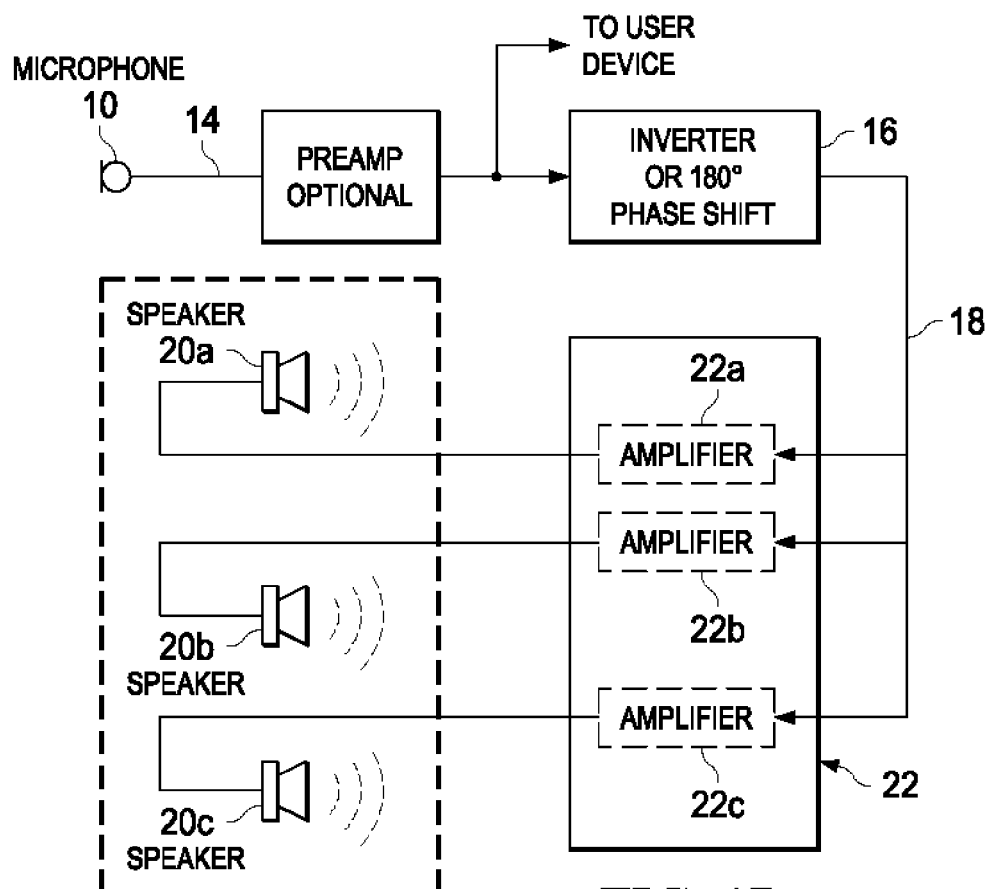
FIG. 1B is another diagram illustrating another embodiment of the invention.
Figure 2B:
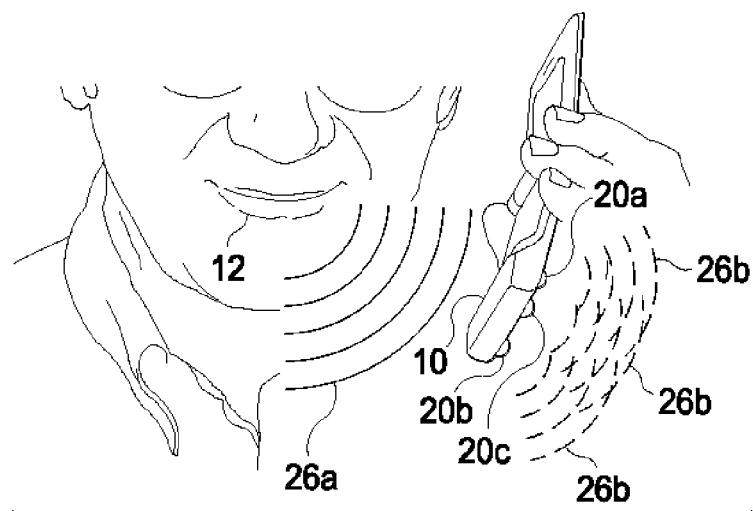
FIGS. 2B and 2C illustrate the placement of a plurality of speakers when the invention is used with a communication device.
Figure 2C:
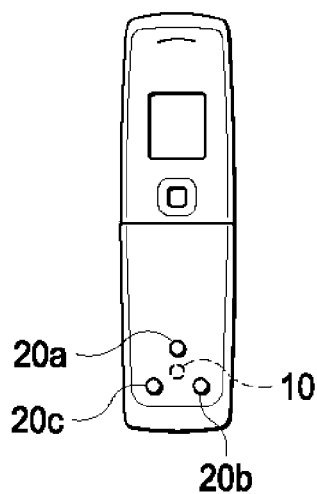

Further, although FIGS. 1A and 2A illustrate a speaker arrangement 20 having a single speaker, it will be appreciated by those skilled in the art that other speaker arrangements may provide better sound cancellation. For example, rather than a single speaker 20 as shown in FIGS. 1A and 2A, two or more speakers and preferably three speakers may be used as shown in FIGS. 1B, 2B and 2C. Further, the inverted or phase shifted additional electrical signals representative of the source sound waves may be provided to a plurality of amplifiers, such as the three amplifiers 22a, 22b and 22c as shown by dashed lines in FIG. 1B. Each of the three amplifiers drives its own speaker 20a, 20b and 20c respectively. Alternately, as also illustrated in FIG. 1B, instead of the plurality of amplifiers 22a, 22b and 22c a single amplifier 22 as illustrated by solid lines may provide a single output to a plurality of speakers 20. As shown in FIGS. 2A, 2B and 2C the speaker or plurality of speakers 20a, 20b and 20c are preferably arranged on the backside (see FIGS. 2B and 2C) of a communication device opposite the microphone 10 on the front side to effect the sound cancellation. As an example, if three speakers 20a, 20b and 20c are used they may be arranged in a triangular pattern that surrounds the microphone that receives the radiating sound waves from the source as illustrated in FIGS. 2B and 2C.

Figure 4A:
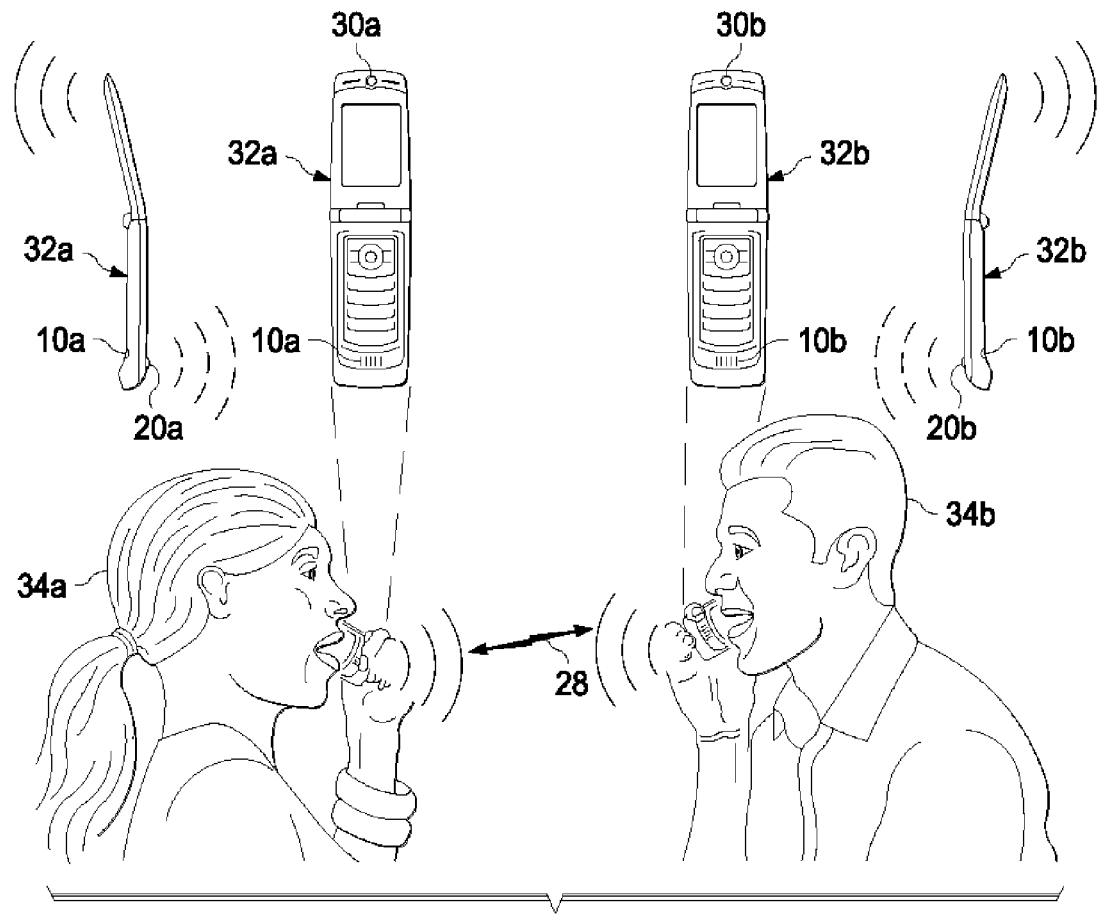
FIGS. 4A and 4B illustrate the invention when used with a handheld communication device and with a "blue-tooth" type communication device respectively.
Figure 4B:
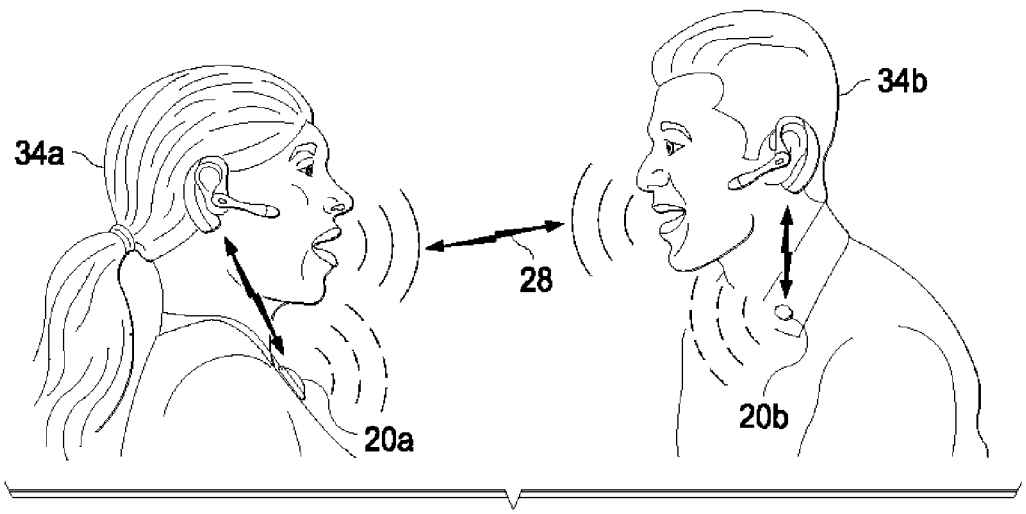

Referring now to FIGS. 4A and 4B, there is shown the present invention being used with a communication device such as a hand-held cell phone or walkie-talkie shown in FIG. A, or a "blue-tooth" communication device shown in FIG. 4B. As shown in the FIGS. 4A and 4B, each of the two communication devices receive and transmit radio signals from and to the other device and then reproduce the audio sounds picked up by the other one of the two devices as is represented by the double headed "lighting arrow" 28.

FIG. 4B also shows two users 34a and 34b, but illustrates that with a "blue-tooth" type device the speakers 20a and 20b may be located a short distance from the sound source. As an example only, the speaker 20a for the man 34a could be a lapel pin, and for the woman 34b could be a neck pendant. However, as discussed above, the speaker 20 is preferably located within a quarter wavelength of the frequency of the sound source. Therefore, although 3400 Hz. is the upper end of the vocal speaking range for the human voice, it is believed 1000 Hz. will effectively cover the frequency of most human voices. Therefore, a speaker arrangement spaced about 10 centimeters from the speakers voice will work but may be somewhat less effective. However, if the speaker 20 is no farther away than about 2.5 centimeters to cover voices at 3400 Hz., the cancellation effect should be most effective. In every case, however, for maximum effect the speaker arrangement should be as close as possible to the sound source.

Figure 5:
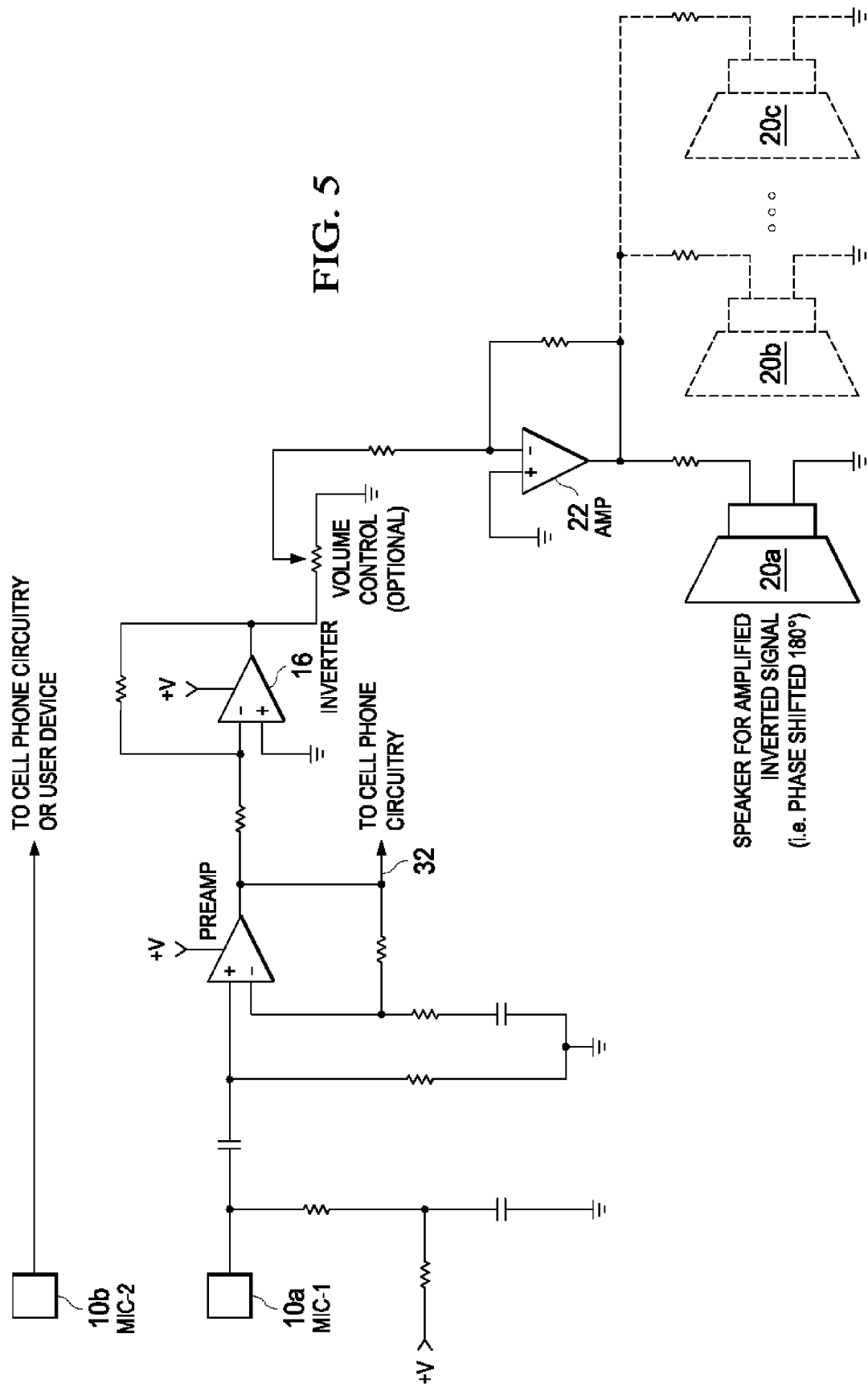
FIG. 5 is an exemplary circuit diagram for carrying out the embodiments of FIGS. 1A and 1B.

FIG. 5 shows a proposed circuit diagram of the apparatus of the present invention. Those elements of FIG. 5 that are common to FIGS. 1A, 1B, 2A and 2B, such as the microphone 10, the inverter 16, the amplifier 22 and the speaker(s) 20 carry the same reference numbers. In addition, the circuitry illustrates that when used with a communication device, a single microphone 10 with a pre-amp circuit 30 may be used to provide electrical signals representing the source sound to both the communication device circuitry as show by connection 32 and the rest of the sound cancellation circuits of the present invention. Alternately, both the noise canceling circuit of the present invention and a user device such as a communication device may each have its own microphone 10a and 10b to provide electrical signals representative of the source sound waves.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, devices or circuitry described in the specification. As one of ordinary skill in the art will readily appreciate from the disclosure of the present invention, processes, devices and electrical circuits presently existing or later to be developed, that perform substantially the same function or achieve substantially the same result as the corresponding embodiments described herein may be utilized according to the present invention. Accordingly, the appended claims are intended to include within their scope such processes, devices and circuits

What is claimed is:

1. Apparatus for reducing selected sounds comprising:
   a source for providing source sound waves within a selected band of frequencies;
   a device for receiving said source sound waves and for generating electrical signals in response to said source sound waves;
   circuitry for receiving said electrical signals and for generating additional electrical signals representative of said source sound waves, said additional electrical signals being delayed by at least one complete wave cycle (360 degrees) up to ten wave cycles plus about 180 degrees with respect to said electrical signals; and
   a device for receiving and generating cancellation sound waves in response to said delayed additional electrical signals, and said device positioned such that said cancellation sound waves interfere with said source sound waves, such that said cancellation sound waves at least partially cancel said source sound waves and said source sound waves at least partially cancel said cancellation sound waves.

2. The apparatus of claim 1 further comprising a user device for receiving electrical signals representative of said source sound waves.

3. The apparatus of claim 2 wherein said user device is a device selected from a group consisting of a two-way communication device, a Public Address (PA) system and a recording device.

4. The apparatus of claim 2 wherein said user device is an audio communication device.

5. The apparatus of claim 4 wherein said audio communication device is a cellular telephone.

6. The apparatus of claim 1 wherein said device for receiving said source sounds is a microphone located on a front lower portion of said communication device and said device for generating cancellation sound waves is a speaker arrangement on a back side of said communication device such that said microphone and speaker arrangement are substantially back-to-back.

7. Two of the audio communication devices of claim 4 wherein said two communication devices are connected to each other such that audio sounds that are picked up by the device for receiving source sounds of one of the two communication devices are reproduced by the other one of the two communication devices.

8. The apparatus of claim 2 wherein said user device further comprising second circuitry for receiving and processing said first electrical signals.

9. The apparatus of claim 6 wherein said user device is a cellular telephone.

10. The apparatus of claim 1 wherein said selected band of frequencies is between 300 cycles per second and 3400 cycles per second.

11. The apparatus of claim 1 wherein said device for generating cancellation sounds is located as close as possible to said source for providing said source sound waves, but preferably no farther away than about 10 centimeters.

12. The apparatus of claim 1 wherein said device for generating cancellation sounds is located as close as possible to said source for providing said source sound waves, but no farther away than about 2.5 centimeters.

13. The apparatus of claim 1 wherein said source is a human voice.

14. The apparatus of claim 1 wherein said additional electrical signals are delayed no more than said about 180° and three full wave cycles with respect to said electrical signals.

15. The apparatus of claim 1 wherein said circuitry for receiving and generating additional electrical signals is a signal inverter.

16. The apparatus of claim 1 further comprising an amplifier for adjusting the amplitude of said additional electrical signals such that said generated cancellation sound waves have substantially the same amplitude as said source sound waves.

17. The apparatus of claim 1 wherein said device for generating cancellation sound waves is a speaker arrangement positioned adjacent to said source and generates said cancellation sound waves having substantially the same amplitude that radiates from said speaker arrangement in substantially the same pattern as said source sound waves.

18. The apparatus of claim 17 wherein said speaker arrangement for generating cancellation sound waves comprises a plurality of speakers surrounding said sound source.

19. The apparatus of claim 18 wherein said speaker arrangement comprises three speakers.

20. Apparatus for reducing sounds of a conversation that can be overheard while using a communication device comprising:
a source for providing source sound waves having frequencies between 300 cycles per second and 3400 cycles per second;
a device for receiving said source sound waves and for generating electrical signals in response to said source sound waves;
a communication device for receiving said electrical signals representing said source sound waves;
circuitry for receiving said electrical signals and for generating additional electrical signals representative of said source sound waves, said additional electrical signals being delayed by at least one complete wave cycle (360 degrees) up to ten wave cycles plus about 180 degrees with respect to said electrical signals; and
at least one speaker positioned no more than 10 centimeters from said source of said waves for receiving and generating cancellation sound waves in response to said additional electrical signals, and said at least one speaker positioned such that said cancellation sound waves interfere with said source sound waves and said cancellation sound waves at least partially cancel said source sound waves and said source sound waves at least partially cancel said cancellation sound waves.

21. The apparatus of claim 20 wherein said communication device is a cellular telephone.

22. The apparatus of claim 20 wherein said speaker is located within 2.5 centimeters of said source of said sound waves.

23. The apparatus of claim 20 wherein said additional electrical signals are about 180° plus no more than three wave cycles out of phase with respect to said electrical signals.

24. A method for reducing selected sounds comprising:
providing source sound waves at a selected point in space and within a selected band of frequencies;
generating electrical signals representative of said source sound waves;
receiving said electrical signals and generating additional or second electrical signals representative of said source sounds wave;
delaying said additional electrical signals by at least one complete wave cycle (360 degrees) up to ten wave cycles plus about 180 degrees with respect to said electrical signals;
generating cancellation sound waves in response to said second electrical signals, said cancellation sound waves being generated at a location no farther away than 10 centimeters from said point in space such that said source sound waves are at least partially cancelled by said cancellation sound waves and said cancellation sound waves are at least partially cancelled by sad source sound waves.

25. The method of claim 24 further comprising providing the source sounds to a communication device.

26. The method of claim 25 wherein said communication device is a cellular telephone.

27. The method of claim 24 wherein said band of frequencies are between about 300 Hz and about 3400 Hz.

28. The method of claim 24 wherein said source sound waves are produced by a person speaking and said cancellation sounds are generated by a speaker located proximate the mouth of said person speaking.

29. The method of claim 24 wherein said step of generating second or additional electrical signals comprises inverting said electrical signals to generate said additional electrical signals.

30. The apparatus of claim 24 wherein said additional electrical signals are about 180° plus no more than three wave cycles out of phase with respect to said electrical signals.

31. A method for reducing sounds of a conversation that can be overheard while using a communication device comprising:
providing source sound waves from a source having frequencies between 300 cycles per second and 3400 cycles per second;
receiving said source sound waves and generating electrical signals representative of said source sound waves;
providing said electrical signals representing said source sound waves to a communication device;
receiving said electrical signals and generating second or additional electrical signals representative of said source sound waves;
delaying said second or additional electrical signals by at least one complete wave cycle (360 degrees) up to ten wave cycles plus about 180 degrees with respect to said electrical signals; and
providing at least one audio speaker adjacent said source and generating cancellation sound waves in response to said additional electrical signals, and said at least one speaker positioned within 10 centimeters from said source of said sound waves such that said cancellation sound waves interfere with said source sound waves and said cancellation sound waves at least partially cancel said source sound waves and said source sound waves at least partially cancel said cancellation sound waves.

* * * * *